CONVERTIBLE BINARY COUNTER AND SHIFT REGISTER WITH INTERSTAGE GATING MEANS INDIVIDUAL TO EACH OPERATING MODE

Filed Jan. 17, 1963 2 Sheets-Sheet 1

INVENTORS D. A. KERR
G. F. SWETNAM, JR.
BY
SE Hollander
ATTORNEY

United States Patent Office 3,294,919
Patented Dec. 27, 1966

3,294,919

CONVERTIBLE BINARY COUNTER AND SHIFT REGISTER WITH INTERSTAGE GATING MEANS INDIVIDUAL TO EACH OPERATING MODE

Douglas A. Kerr, Springfield, and George F. Swetnam, Jr., Matawan, N.J., assignors to Bell Telephone Laboratories, Incorporated, New York, N.Y., a corporation of New York Filed Jan. 17, 1963, Ser. No. 252,071
13 Claims. (Cl. 179—18)

This invention relates to convertible binary counter-shift registers and more particularly to combined binary counter-shift registers for use in telephone line concentrator systems.

As is well known, line concentrator systems are adapted to provide telephone service to a relatively larger number of substation lines over a smaller number of shared trunks which extend to a telephone central office. The manifest advantage of line concentration is the reduction in outside plant costs attendant upon servicing of lines on a "shared" basis in lieu of the traditional direct line from each substation to the telephone central office. However, the usual supervisory facilities at the central office for determining line on-hook and off-hook conditions including the conventional line relay are unavailable in concentrator operation since there is no permanent direct connection between the telephone line and the office. Instead, supplementary facilities are provided for scanning the remote lines which are terminated at the remote switching unit. An advantageous type of scanning operation (sometimes referred to as "dynamic" scanning) is predicated on the synchronous advance of a line counter at the central office and a line counter at the remote unit as each line is scanned in turn. When the scanner detects a service request condition, a signal is delivered to the central office to arrest the scanner thereat. Since the counter at the central office has been arrested at a count indicative of the line requesting service, sufficient information exists in the office to identify the line and ultimately establish a connection thereto over a selected idle trunk.

Although completely operative and useful, this system experiences a number of restrictions including the necessity for maintaining absolute synchronism between the central office and the remote unit to insure accuracy of line identification and, in addition, the necessity for repeated transmission of interrogation or advance pulses from the central office to actuate the remote unit counter. This difficulty is aggravated by the recognition that the advance pulses must be continuously transmitted from the central office to the remote unit even during quiescent periods of the concentrator—i.e., when no lines are requesting service.

A solution to this problem is available if the remote unit is provided sufficient autonomy to permit the independent operation of the line counter thereat under the influence of a local advance pulse source at the remote unit. Although this precludes the difficulties occasioned by the transmission of advance signals from the central office to the remote unit, when the remote unit counter is now arrested in consequence of a line requesting service, the central office must be advised of the identification of the line since no corresponding counter exists at the office.

It is therefore an object of this invention to provide for the operation of a remote unit counter from a local pulse source and for the transmission of counter information to the central office.

In certain prior art concentrator arrangements the relative functions of various equipments at the remote concentrator switching unit have been carefully defined and segregated. Thus, for example, a counter at the remote unit was specifically designed to perform exclusively counting operations. When a certain desired count was arrived at and it became necessary to transmit information relative to the count to the central office, an entirely distinct entity in the form of a transmitting device or other signaling arrangement was operated in response to the counter setting to forward the appropriate information to the central office. It is significant to observe in this regard that the counter itself was not adapted to forward the information to the office but instead was required to summon a separate instrumentality to complete this necessary function. The disadvantages of this type of divided, unifunctional operation are obvious when the physical context of the remote concentrator equipment is examined. Thus, it is not unusual for a remote line concentrator to be installed on a telephone pole or in an underground vault—situations where size and weight are critical parameters.

In consequence, it is an object of this invention to provide a combined counting and signaling arrangement for the remote concentrator of a telephone system which is adapted in a single apparatus to perform these functions with equal efficiency.

In certain prior art convertible binary counter and shift register arrangements, interstage steering networks included adequate memory capacity (often in the form of a capacitor) for permitting a comparison between the binary condition stored in a particular stage and the binary condition stored in a succeeding stage to determine the ultimate binary condition of the succeeding stage. For example, if a particular stage of a shift register has a binary "1" stored therein and the succeeding stage of a shift register has a binary "1" stored therein, it is not essential to transmit a "change" pulse to the succeeding stage.

However, if a binary counter has a "1" stored in a particular stage and a "1" stored in the succeeding stage, it is necessary to transmit an interstage "carry" pulse to alter the state of the succeeding stage to a "0."

It will be seen that in view of the necessity for comparing the binary conditions in adjacent stages and in view of the memory capacity of the interstage network as an adjunct in accomplishing this result, a threat of mutilation of the information exists when a change is effected from the binary counter to the shift register mode of operation. For example, it may be assumed that a binary counter has been arrested at a count representative of a line requesting service and a particular stage of the binary counter has a "1" stored therein and the following stage also has a "1" stored therein. In a conversion from the binary counter to the shift register mode preparatory to outpulsing the information stored in the counter to the telephone central office, the change of potential at the interstage steering network occasioned by the mode transformation will be interpreted by the succeeding stage as an advance of the count requiring a legitimate "change" pulse. Under these conditions the succeeding stage will be changed from a binary "1" to a binary "0"—an obvious error, since the succeeding stage originally stored a binary "1."

It is therefore an additional object of this invention to provide for transformation in a convertible binary counter and shift register from the binary counter to shift register mode and vice versa without mutilation of information in the binary counter.

These and other objects and features of the invention have been realized in a specific illustrative embodiment in which the interstage steering networks between adjacent stages of a convertible binary counter and shift register are adapted to prevent the transmission of a "change" pulse from a particular stage to a succeeding stage during the transformation from the binary counter to shift register mode and vice versa.

During a quiescent period of operation, i.e., when all concentrator lines are on hook, the binary cells operate in a binary counter mode autonomously (i.e., under control of the local pulse source) and without control assistance from the office. As each new count is recorded in the register reflecting a particular line identity, the line itself is examined by a line scanner under control of the counter for changes in service request condition. If the line does not exhibit a change, the counter continues its advance to the following line where the operation is repeated. This procedure continues until a line goes off hook or changes in supervisory condition. When the counter and scanner have advanced to this line, further operation of the counter is momentarily arrested. Thus, the counter at the remote line concentrator is now in a state indicative of the identity of the service requesting line. It is now essential to transmit this information from the remote line concentrator to the central office. The binary cells are controlled by signals applied to the interstage steering networks to enter into the shift register mode of operation and, in consequence, the information previously stored in the binary counter representing the identity of the line is serially transmitted to the central office where this information is registered.

Subsequently, a trunk which is idle may be connected to the line requesting service at which time a signal is transmitted to convert the operation of the binary cells back to the binary counter mode whereupon scanning is recommenced.

A particular advantage of the present arrangement includes facilities for rapid conversion from shift register to binary counter operation and vice versa without mutilation of the information stored in the registers.

To appreciate the threat of mutilation which exists in a transformation from shift register operation to binary counter operation or vice versa, it may be useful to consider a particular example. In certain prior arrangements, adjacent stages of a counter were coupled by an interstage steering network including two gates. A first gate was continuously coupled between corresponding elements (e.g., the "1" elements) of the flip-flops in adjacent stages. The second gate in shift register operation was similarly coupled between the complementary elements ("0" elements) of the flip-flops.

In converting from shift register to binary counter operation, the first gate connections remain unchanged and continue to couple corresponding elements (for example, the "1" elements or transistors of the flip-flops) but the second gate has the connection leading to the preceding stage "0" element output changed to the output of the "1" stage element of the preceding flip-flop. It is thus apparent that a possibility exists of changing the input to the second gate when the connection is transferred between elements since the outputs of the "0" and "1" elements of the preceding stage are by definition at different potentials.

This is the same change which would occur if the previous stage should subsequently change state as the count advances, and hence could cause a false carry pulse at the succeeding stage.

To insure against spurious transmission of a change pulse to a succeeding stage from the interstage steering network in view of a potential change occasioned by the shift in mode, a separate and additional interstage steering network is provided exclusively for use in the binary counter function. Thus, three interstage steering networks are incorporated between adjacent stages. One interstage steering network is common to the binary counter and shift register modes of operation. Of the other two, one is exclusively reserved for the binary counter mode of operation and one for the shift register mode. Each of the latter two is electrically effective only in one mode of operation. However, the latter gates need not be fully duplicated. Instead, they may advantageously share common elements without adverse interaction as explained in detail herein.

In essence, each of the interstage steering networks includes a diode and capacitor gate of the type adverted to above. In those instances in which a change pulse is to be transferred to a succeeding stage, the capacitor is permitted to initially charge from a potential source intermediate the diode and capacitor. Subsequently, in order to change the state of the succeeding stage, the capacitor is discharged in order to divert current flow from the succeeding stage to turn off a transistor flip-flop in that stage. In those instances in which shift register operation is desired, the potential source intermediate the diode and capacitor of the interstage steering network exclusively reserved for binary counter operation is deenergized. This is achieved conveniently by connecting the binary counter and shift register gates to the output of a control flip-flop which is arranged to alter the potential at terminals intermediate the diode and capacitor at a rate which is relatively long compared to the rise time of the change pulse, illustratively one hundred times longer.

These and other objects and features of the invention may be more readily comprehended from an examination of the following specification, appended claims and attached drawing in which FIGS. 1 and 2 (when placed to the right of FIG. 1) show the cascaded arrangement of convertible cells which permit the utilization of the register stages as a shift register or a binary counter.

*General description*

Referring now to FIGS. 1 and 2, it may be seen that four register stages 1–4 are coupled by interstage steering networks 5–7. The mode of operation of the register as a binary counter or as a shift register is determined by the condition of control flip-flop 114. When the flip-flop is in the binary "0" condition and a positive potential (for example, 12 volts) is delivered on conductor 118 with a complementary potential of ground at conductor 117, the register is adapted for binary counter operation. Under these conditions, the ground potential from conductor 117 applied to terminal 61 inhibits the diode gate 60.

Similarly, when the control flip-flop is in the "1" condition and a potential of 12 volts is applied over conductor 117 to terminal 61 with a ground potential applied over conductor 118 to terminal 62, the gate including diodes 58 and 69 is inhibited to preclude operation as a binary counter and to permit operation as a shift register. Capacitors 68 and 72 and resistors 104 and 105 provide for a relatively long rise time in any transfer from a binary "1" to a binary "0" condition, and vice versa, relative to the rise time of the change pulses applied to the interstage steering networks from the count pulse source 111 and the shift pulse source 119, to prevent errorneous operation of succeeding stages of the shift register when the control flip-flop transfers. Thus, illustratively the rise time of the potentials applied by flip-flop 114 may be one hundred times longer than those of the change pulses.

It will be noted as explained herein in detail that the operation of any particular stage of the register is determined by the condition previously stored therein, the condition previously stored in the preceding register and the mode of operation, i.e., binary counter or shift register.

Thus, if the register is operating as a binary counter with a "1" condition (upper transistor nonconducting) stored in the first two stages, the new condition of the second stage upon the advent of an additional pulse from source 111 may be determined by examining capacitors 53 and 59 of network 5. The condition of capacitor 57 need not be examined since terminal 61 is at ground potential over conductor 117 during binary counter operation. In the assumed illustration, the right-hand electrode of capacitor 53 is substantially at 12 volts from the collector electrode of transistor 21 and the left-hand electrode of capacitor 53 is at a similar potential from source 47.

The right-hand electrode of capacitor 59 is substantially at ground potential in view of the conducting condition of transistor 22 and the left-hand electrode of capacitor 59 is at substantially a 12-volt potential over the conductor 118.

When the succeeding pulse from the pulse source 111 drives the first register stage into the opposite conducting condition, that is, binary "0," transistor 12 is driven into nonconduction and transistor 11 begins to conduct.

Thus, a negative pulse appears at the collector electrode of transistor 11 and is delivered to the left-hand electrodes of capacitors 53 and 59. The pulse is delivered through both capacitors but does not pass through diode 56 as the potential at its cathode does not fall below 0 volts. Thus, the pulse does not appear at the base electrode of transistor 21 which is already nonconducting. Transistor 22 is driven into nonconduction, however, by virtue of the negative pulse at the base electrode thereof. This negative pulse derives from the original charge of the capacitor with 12 volts at the left-hand electrode and ground at the right-hand electrode. When the left-hand electrode is instantaneously grounded, the right-hand electrode is driven to substantially minus 12 volts. Through flip-flop action, transistor 21 is driven into conduction. Specifically, when the collector electrode of transistor 22 approaches ground, diode 28 is forward biased and shunts current away from the base of transistor 21 to drive that transistor into nonconduction. Thus, the binary condition of both stages has been transferred from a binary "1" to a binary "0" to reflect the new binary count therein.

To examine the operation of the register in the shift register mode, it is understood that the control flip-flop is energized to deliver a positive potential of substantially 12 volts on conductor 117 and a ground potential on conductor 118. Again it will be assumed that a binary "1" condition is stored in the first two shift register stages. Under these circumstances, these two operative capacitors are 53 and 57 since capacitor 59 and diode gate 69 are, in effect, disabled by the lack of charging potential supplied to terminal 62. Thus, the right-hand electrode of capacitor 53 is substantially at 12 volts from the collector electrode of transistor 21 and the left-hand electrode of capacitor 53 is substantially at the same potential from source 47. The right-hand electrode of capacitor 57 is at a potential approaching ground from the collector electrode of transistor 22 and a similar potential appears at the left-hand electrode of capacitor 57 from the collector electrode of transistor 12.

On the advent of the succeeding shift pulse from source 113, the negative or ground potential applied to the left-hand electrode of both capacitors 53 and 57 over diodes 63 and 64 produces substantially no effect at capacitor 57 in view of the ground condition existing thereat. However, the left-hand electrode of capacitor 53 experiences a negative voltage excursion and a pulse is delivered to the cathode of diode 56. This pulse is not passed by diode 56 since the potential of its cathode does not fall below 0 volts. The pulse thus has no effect on the nonconducting condition of transistor 21. Thus, the second stage of the register continues to store a binary "1" condition.

The first stage of the register is converted from a binary "1" to a binary "0" condition in view of the direct positive pulse applied to the base electrode of transistor 11 from shift pulse source 119 over inverter 13. As a result, the conditions of the first and second register stages subsequent to the arrival of the shift pulse are "0" and "1," respectively, in accordance with shift register operation. The effect on succeeding stages will be analyzed in detail herein.

It will be noted from the configuration of FIGS. 1 and 2 and particularly the steering networks 5, 6 and 7 that distinct gates are utilized for the binary counter and shift register operation. Thus, as explained above, capacitors 59 and diodes 69 are utilized in binary counter operation whereas capacitors 57 and diodes 60 are utilized only in shift register operation. Capacitors 53 and diodes 55 are utilized under both operating modes. In view of the separation of the gates, the mutilation of any information stored in the binary stages (and in the memory capacitors 53, 57 and 59) is prevented upon a change in mode since the inputs to diode gates 60 and 69 do not change potential upon such a change of mode. Moreover, since the potential does not change at the right-hand side of capacitors 57 and 59 in mode conversion, resistor 66 and diode 58 may be jointly utilized to achieve a reduction in components.

*Detailed description*

Figure 1:
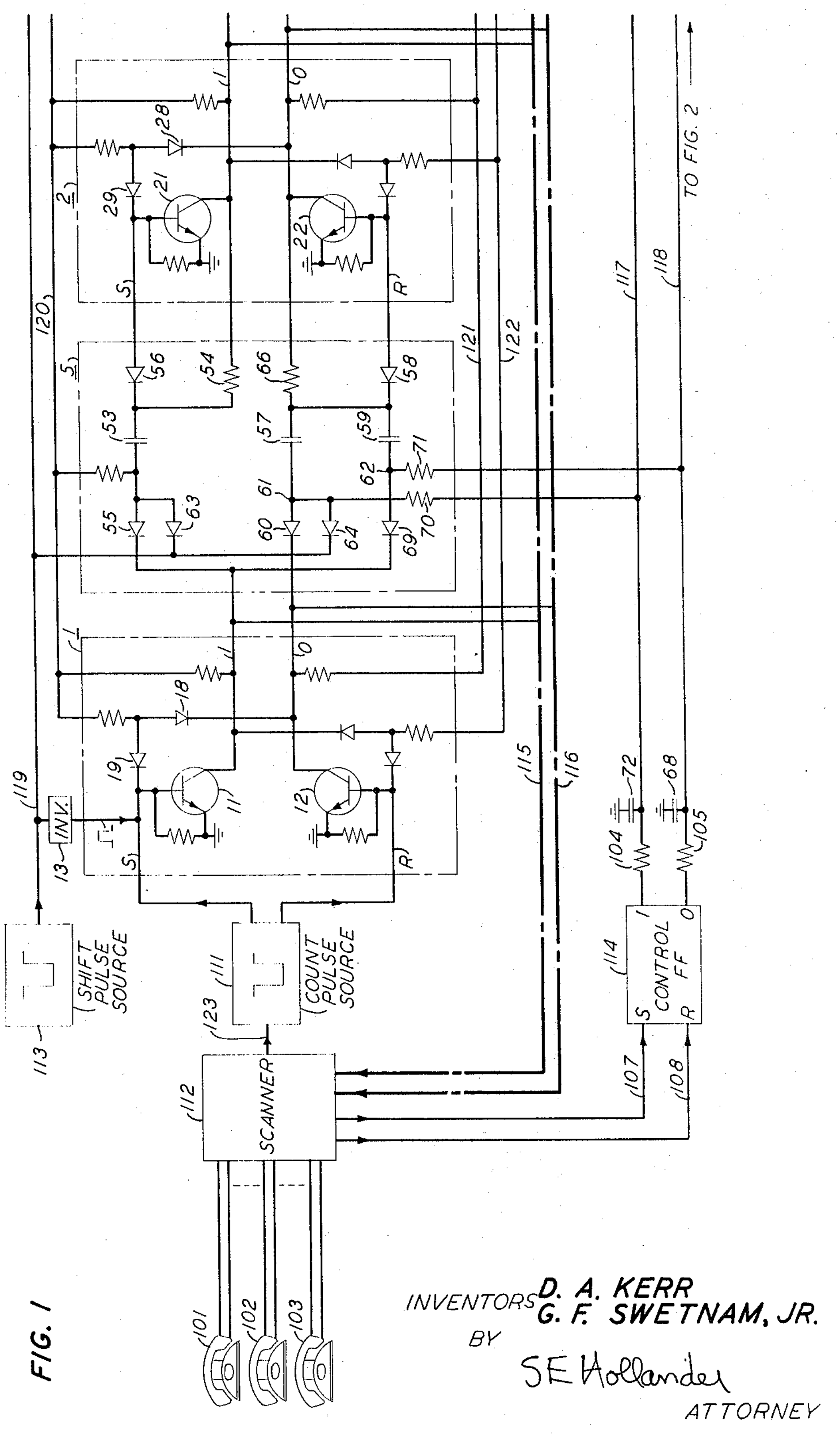
Figure 2:
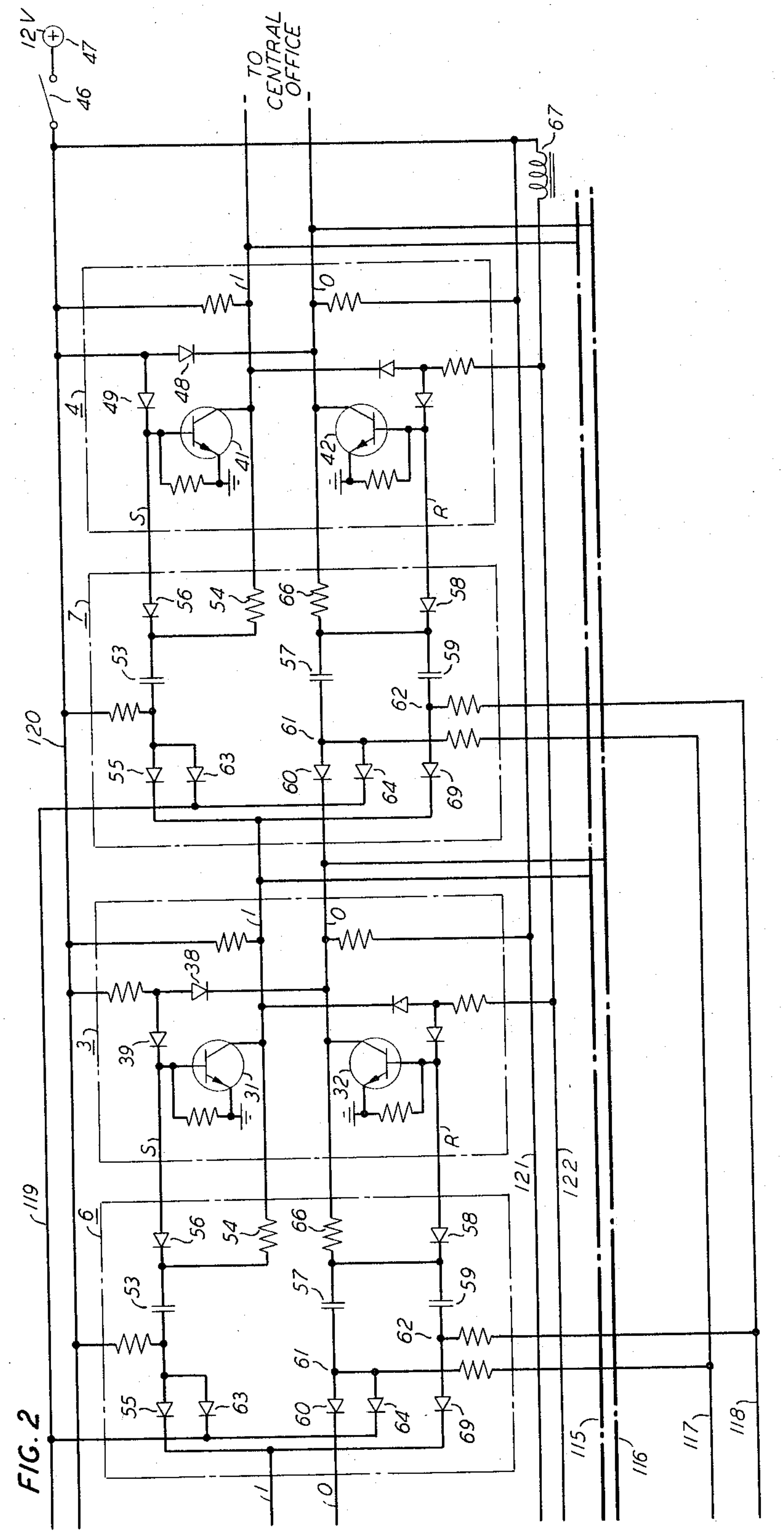

Referring now to FIGS. 1 and 2, a four-stage convertible binary counter and shift register is shown. Similar interstage steering networks 5, 6 and 7 are disposed intermediate adjacent stages of the register.

Under quiescent conditions, a count pulse source 111 continuously delivers clock pulses to the first stage 1 of the register to advance the count therein. Simultaneously, output pulses are delivered to scanner 112 over cables 115 and 116 to control the scanner to observe the substations 101–103 for service request conditions. The manner in which the scanner and counter are advanced is disclosed, for example, in Patents 3,033,937 of W. C. Jones of May 8, 1962, and 3,061,682 of F. P. Cirone of October 30, 1962.

It will be noted that the scanner is controlled in response to the output of each of the binary stages 1–4 over cables 115 and 116 which comprise the output conductors of all of the binary stages.

When the scanner detects a service request condition on substations 101–103, a signal is delivered over conductor 123 to arrest the count pulse source 111 and prevent the delivery of further pulses to the first stage of the register. In consequence, the then existing count in the register is indicative of the line requesting service.

*Binary counter operation*

For purposes of illustration it will be assumed that substation 102 is initiating the service request and that the count pulse source 111 has been arrested in view of the service request condition detected by scanner 112. It will further be assumed, in order to illustrate the operation of the register stages, that the binary conditions stored in stages 1–4 are 0101, respectively. Since binary stage 2 has a "1" stored therein and binary stage "1" has a "0" stored therein, an examination of the interstage steering network 5 will indicate the states which the respective stages will assume on the advent of the next input pulse. Hereinafter it will be arbitrarily considered that the "off" or "high" condition of the transistor connected to the "1" output, i.e., transistors 11, 21, 31 and 41, represents the storage of a "1" condition in the register. Similarly, the "high" potential or "off" condition of transistors 12, 22, 32 and 42 represents the storage of a "0" condition in the respective register. Under these assumptions transistor 21 is in the "off" condition as is transistor 12 whereas transistors 22 and 11 are conducting.

In view of the "off" condition of transistor 21, the potential of source 47 appears at the collector electrode of transistor 21 and over resistor 54 at the right-hand electrode of capacitor 53. Since transistor 11 is conducting, the collector electrode thereof is substantially at ground potential and, in consequence through diode gate 55, the left-hand electrode of capacitor 53 is at ground potential and the capacitor is charged.

Referring now to capacitor 59, a similar analysis indicates that the right-hand electrode thereof is substantially at ground potential from the collector electrode of transistor 22 and the left-hand electrode is at ground potential from the collector of transistor 11 through diode gate 69. In consequence, capacitor 59 is not charged.

On the advent of the succeeding pulse delivered from count pulse source 111, the first stage register shifts in binary condition from a "0" to a "1" and as a result transistor 11 is driven into the nonconducting condition whereas transistor 12 is driven to the "on" condition in accordance with the assumed criteria. When transistor 11 is driven to the "off" condition, the collector electrode thereof experiences a potential excursion in the positive direction from ground to a voltage substantially approaching that of source 47. This positive pulse is blocked by diodes 55 and 69 and hence does not affect transistors 21 or 22. Thus, the condition of the first two stages is now 11, respectively, with both transistors 11 and 21 in the "off" condition. The state of the following two stages, namely 3 and 4, is unchanged in view of the lack of any output on the conductors "1" and "0" of the second stage. In consequence, the binary conditions now stored in the first four stages of shift register are 1101, respectively.

On the advent of the next binary pulse input from count pulse source 111, the first stage flip-flop is again, of course, changed. To examine the impact of this change on the succeeding stages, it is necessary to observe the potential conditions existing in the interstage steering networks. Referring again to interstage network 5, the potentials applied to capacitor 53 prior to the pulse input, in view of the nonconducting conditions of transistors 11 and 21, include a relatively "high" potential from source 47 and a similar potential from the collector electrode of transistor 21. Although the collector electrode of transistor 11 is at the potential of source 47, the left-hand electrode of capacitor 53 is at approximately the same potential, and thus diode 55 has no appreciable effect. Substantially no potential difference exists across capacitor 53 which remains uncharged. Capacitor 59 has a ground potential applied to the right-hand electrode thereof over resistance 66, and a positive potential applied to the left-hand electrode thereof over conductor 118 resulting in a potential difference across capacitor 59 and, in consequence, capacitor 59 is charged.

On the advent of the succeeding input pulse, as described, the first stage changes from a binary "1" to a binary "0" condition and as a result the collector electrode of transistor 11 experiences a negative excursion, i.e., it drops from a voltage approaching that of source 47 to a voltage approaching ground. This negative potential is applied to diodes 55 and 69 in parallel and over capacitors 53 and 59 to the cathodes of diode gates 56 and 58. Since the cathode potential of diode gate 56 does not fall below 0 volts, the pulse is not passed to the base electrode of transistor 21. However, with respect to transistor 22 which is conducting, the negative pulse (illustratively minus 12 volts) applied to the base electrode through diode gate 58 drives the transistor into nonconduction and as a result of flip-flop action over diodes 28 and 29, transistor 21 is driven into conduction. In summary, the first two stages of the register which previously stored binary "1's" are now converted to the storage of binary "0's."

It will be noted that the "shift register" capacitor 57 is ineffective to deliver any pulses to the succeeding stage since the left-hand electrode cannot charge to any potential above ground when the circuit is in the binary counter mode.

In the assumed example, the latest count prior to the operation of the second stage was 1101 in the first four stages, respectively. In consequence, capacitor 53 of steering network 6 originally had a ground condition at the right-hand electrode thereof and a positive potential from source 47 at the left-hand electrode resulting in the storing of a charge in capacitor 53. Capacitor 59 in the same network had a positive potential at the right-hand electrode thereof and a substantially equal positive potential at the left-hand electrode thereof. When the second binary stage shifts from a binary "1" to a binary "0," as just described, the collector electrode of transistor 21 of stage 2 experiences a negative voltage excursion which is transmitted through capacitors 53 and 59 to the cathodes of diodes 56 and 58, respectively. Since the cathode potential of diode 58 does not fall below 0 volts no pulse is passed to the base of transistor 32. However, the negative pulse through diode 56 at the base electrode of transistor 31 drives that transistor into nonconduction and, in consequence, transistor 32 is driven into conduction. Thus, the third stage shifts from a binary "0" to a binary "1" condition. Capacitor 57 of this network is disabled as described above, and has no effect.

In examining the effect on the fourth stage, it should be appreciated that the original conditions stored in the third and fourth stage are "0" and "1," respectively. As a result, capacitor 53 of network 7 is charged in consequence of the ground condition at the left-hand electrode thereof and the relatively "high" potential condition at the right-hand electrode thereof from source 47. Capacitor 59 has the right-hand electrode thereof substantially at ground potential and the left-hand electrode approaching that of the collector electrode of transistor 31 which is at ground potential. In consequence, capacitor 59 has substantially no potential thereacross. When transistor 31 is changed from the conducting condition to the nonconducting condition to store a binary "1" therein, as discussed above, a positive pulse appears at the collector electrode of transistor 31. This polarity of pulse is precluded from passing through diodes 55 and 69 and capacitor 57 is inactive; in consequence, no pulse is delivered to the fourth binary stage of the shift register which continues to store the previous binary "1" condition. Under these circumstances, the first four binary stages now store the binary conditions 0011, respectively.

Subsequent pulses delivered to the first stage from the count pulse source 111 activate the register in a manner similar to that described above to continually advance the binary count stored in the register. Thus, the succeeding pulse from source 111 to the first shift register stage will result in advancing the count therein from 0011 to 1011, 0111, etc. In consequence of the varying output conditions at the output conductors "1" and "0" of each of the shift register stages as applied over cables 115 and 116, the scanner 112 is directed to observe the service conditions of each of the lines connected thereto, only three being shown as illustrative. Ultimately, if the scanner detects a service request condition, an arrest pulse is delivered to the count pulse source 111 to prevent the application of further input pulses to the register. This action "freezes" the identification of the line requesting service. Since all of the equipment shown in FIGS. 1 and 2 is assumed to be incorporated at the remote unit of a line concentrator, it is necessary to deliver the identification of the line requesting service to the central office preparatory to the selection of a trunk for connection to the line. The out-pulsing of the line identification is achieved as described herein under the explanation of the operation of the four register stages in the shift register mode.

*Shift register operation*

For purposes of illustrating the operation of the four register stages as a shift register, it will be assumed that when the binary count 1101 was reached indicative of substation 102 in the manner described above, the scanner 112 detected a service request condition at substation 102 and delivered an arrest pulse over conductor 123 to count pulse source 111. Moreover, the scanner delivers a mode conversion pulse over conductors 107 and 108 to convert the control flip-flop from a binary "0" condition in which a relatively "high" potential (illustratively 12 volts) appears on conductor 118 and substantially ground potential appears on conductor 117 to the complementary situation in which a 12-volt potential appears on conductor 117 and a ground potential on conductor 118. At this time the ground potential on terminal 62 of each of the interstage steering networks, in effect, inhibits the gate leading to the collector electrode of the previous stage and prevents the passage of any pulses through capacitor 59 by preventing the capacitor from charging in a direction which will permit transmission of pulse more negative than ground. Conversely, the removal of the disabling ground potential from terminal 61 and the application of a positive potential thereto permits the functioning of the diode 60 leading to the collector electrode of the lower transistor of the previous stage. Moreover, after the mode transformation from binary counter to shift register operation, actuation of the shift pulse source 113 to deliver negative pulses over bus 119 to the interstage steering networks results in the advance of the binary information 1101 indicative of the identity of substation 102 through the register to the central office. Auxiliary transmitting equipment is not shown to preserve clarity.

For example, referring to the third and fourth shift register stages, it is seen that a binary "0" is stored in the third stage and a binary "1" in the fourth stage. In consequence, the right-hand electrode of capacitor 53 in network 7 is substantially at the collector electrode potential of transistor 41 or approximately the potential of source 47 whereas the left-hand electrode of capacitor 53 is substantially at ground potential.

Similarly, the right-hand electrode of capacitor 57 is at ground potential from the collector electrode of capacitor 57 is at ground potential from the collector electrode of transistor 42 and the left-hand electrode of capacitor 57 is at a relatively "high" potential over conductor 117. The negative pulse applied over diodes 63 and 64 from the shift pulse source 113 drives the left-hand electrode of both capacitors 53 and 57 to ground potential. Since the left-hand electrode of capacitor 53 is already at ground potential, no pulse is transmitted through the capacitor. However, the left-hand electrode of capacitor 57 is driven from a potential of approximately 12 volts to ground potential and a negative pulse of substantially minus 12 volts is applied over diode 58 to the base electrode of transistor 42 to drive that transistor into the non-conducting condition and in turn to drive transistor 41 into the conducting condition. All capacitors 59 are prevented from charging in this mode by the lack of any potential above ground as supplied from lead 118. Hence, no pulse can pass through any diode 69 and capacitor 59 to interfere with this action. In short, on the advent of the first shift pulse, the fourth binary stage is shifted from a binary "1" to a binary "0" condition.

To indicate the condition of the third binary stage after the advent of the first shift pulse, it should be remembered that in the assumed illustration, a binary "1" was initially stored in the second stage and a binary "0" was stored in the third stage. As a result capacitor 53 of network 6 has a potential approaching ground at the right-hand electrode thereof and a positive potential from source 47 at the left-hand electrode thereof. Capacitor 57 has a positive potential from source 47 at the right-hand electrode thereof and a ground potential at the left-hand electrode thereof from the collector of transistor 22. Thus, the negative shift pulse applied to the left-hand electrode of capacitors 53 and 57 produces no change at capacitor 57 but results in a negative-going pulse through capacitor 53 and diode 56 to the base electrode of transistor 31. Since transistor 31 is in the conducting condition, it is driven into nonconduction by diverting current away from the base electrode and transistor 32, previously nonconducting, is driven into conduction. Thus, the third register stage which previously stored a binary "0" now stores a binary "1."

The condition of the second stage of the shift register may be determined by evaluating the conditions of capacitors 53 and 57 prior to the advent of the shift pulse. Since a binary "1" was stored in both stages 1 and 2, the right-hand electrode of capacitor 53 is at a relatively "high" potential from the collector electrode of transistor 21 and the left-hand electrode of capacitor 53 is substantially at the potential of source 47.

The right-hand electrode of capacitor 57 is substantially at ground potential in view of the conducting condition of transistor 22 whereas the left-hand electrode of capacitor 57 is also substantially at ground potential in consequence of the conducting condition of transistor 12. Thus, neither capacitor 53 nor capacitor 57 is charged. Upon the arrival of the shift pulse, the left-hand electrode of capacitors 53 and 57 are driven substantially to ground potential. The negative pulse thus applied to capacitor 53 drives the cathode of diode 56 in the negative direction. However, since the cathode potential of diode 56 does not fall below 0 volts no pulse is fed to the base of transistor 21 which is unaffected. The ground condition applied at capacitor 57 creates substantially no effect thereat since the left-hand electrode of capacitor 57 is already at ground potential. In consequence, no pulse is applied to the base electrode of transistor 22. Since neither transistor 21 nor 22 is changed in condition, the second shift register stage continues to store a binary "1."

The condition of the first shift register stage after the application of the shift pulse is simply determined by observing that the shift pulse is applied over inverter 13 to impress a positive potential on the base electrode of transistor 11. Since transistor 11 is nonconducting, the positive potential thus applied drives the transistor into conduction. Transistor 12 which was previously conducting is now driven into nonconduction through flip-flop action. In consequence, a binary "0" is stored in the first shift register stage.

In summary, the assumed binary conditions in the first four shift register stages were originally 1101, respectively, and after the arrival of the first shift pulse, the new conditions stored in the shift register are 0110, respectively, in accordance with traditional shift register operation.

In line with the procedure described above, it may be seen that the second shift pulse changes the storage in the register to 0011, respectively; the third shift pulse changes the storage to 0001, respectively; and the fourth shift register pulse completes outpulsing and transmission to the central office of the final "1" stored in the fourth shift register stage. Thus, the register equipment at the central office now stores the complete identification of the calling line 102 and procedures may be undertaken in the central office, for example as described in the above-referred-to W. C. Jones patent, to select a trunk for connection to the service requesting line. Thereafter, a signal may be transmitted to the remote unit by means, not shown herein but described in detail in the above-referred-to Jones patent, to re-energize the scanner 112, count pulse source 111, and the flip-flop 114 to convert the register back to the binary counter mode of operation. This procedure returns the circuit to the original conditions under which the scanner 112 successively examines the service condition of the lines connected thereto under the influence of the count pulse source 111, and the binary counter is advanced on a step-by-step basis under control of the pulse source 111.

Inductor 67 and switch 46 are provided as a means of resetting the counter to the 0000 state. Resetting is done by a momentary power shutdown. When power is restored by switch 46, inductor 67 delays the application of base drive current to transistors 12, 22, 32 and 42. The time delay is long enough to insure that transistors 11, 21, 31 and 41 will go into conduction, and the register is in state 0000. Current flow through the inductor 67 during normal operation is nearly constant, and therefore does not affect routine operation.

It will be noted that appropriately poled diodes (not shown) in series with resistors 70 and 71 may be utilized in lieu of time delay capacitors 68 and 72 to prevent capacitors 57 and 59 from charging in a direction required to transmit negative pulses to the succeeding stage.

It is to be understood that the above-described arrangements are illustrative of the application of the principles of the invention. Numerous other arrangements may be devised by those skilled in the art without departing from the spirit and scope of the invention.

What is claimed is:

1. A combined shift register and binary counting circuit including a plurality of tandemly connected stages, interstage coupling means between said stages, said coupling means including a plurality of gates interconnecting said stages, means for enabling a first of said gates continuously between said stages, means for enabling a second of said gates between said stages for operation in a binary counter mode, means for inhibiting said second gating means and enabling a third gating means between said stages to permit operation in a shift register mode, and additional means for transforming operating modes while maintaining the existing binary inputs to said gates.

2. A convertible shift register and binary counter circuit including a plurality of serially connected stages, interstage network means between said stages, each of said stages including first and second binary elements, said network means including first gating means coupling said first elements of adjacent stages, second and third gating means in said network means, means for energizing said second gating means to interconnect said second elements of adjacent stages during a shift register mode of operation, means for inhibiting said second gating means and for energizing said third gating means to interconnect said first element of a preceding stage and said second element of a succeeding stage during operation in the binary counter mode, and additional means for converting between operating modes while maintaining predetermined potentials at the inputs to said gating means.

3. A convertible shift register and binary counter circuit including a plurality of serially connected stages, each of said stages including first and second binary elements, interstage gating means including first, second and third gating means coupling said stages, said first gating means connecting first binary elements of said stages, control flip-flop means for converting between operating modes while maintaining predetermined potentials at the inputs to said gating means, means responsive to the energization of said control flip-flop means to a first binary condition to energize said second gating means to interconnect said second elements of adjacent stages for operation in a shift register mode, means responsive to the energization of said control flip-flop to the opposite binary condition to energize said third gating means to interconnect said first element of a preceding stage and said second binary element of a succeeding stage for binary counter operation, and means for transferring signals between said stages including means for diverting current from the binary element of a succeeding stage to store a particular binary condition therein.

4. A convertible binary counter and shift register circuit including a plurality of tandemly connected stages, interstage coupling means intermediate said stages, each of said stages including a flip-flop having first and second binary elements, said interstage coupling means including first, second and third diode-capacitor gates, bias means coupled to the junction intermediate said diode and capacitor of said first gate, means for connecting said capacitor of said first gate to said first element of a succeeding stage, means for connecting said diode of said first gate to a first element of a preceding stage, control flip-flop means including complementary output conductors respectively coupled to junctions intermediate said idodes and capacitors of said second and third gates for transforming operating modes while maintaining the existing binary inputs to said gates, means effective in response to a first state of said control flip-flop means for coupling said diode of said second gate to a second element of a preceding stage and for coupling said capacitor of said second gate to said second element in a succeeding stage, and means effective in response to a second state of said control flip-flop means for coupling said diode of said third gate to said first element of a preceding stage and for coupling said capacitor of said third gate to said second element of said succeeding stage.

5. A convertible line counter and shift register for use in a telephone line concentrator system including a plurality of stages, interstage gating means including first, second and third gates intermediate said stages, a plupulses delivered from said source to control said scanning means for examining the service condition of said lines, means for energizing said counter in accordance with pulses delivered from said source to cotrol said scanning means to examine said substation lines, said means for controlling said scanning means including said first and second gates, and means for converting the operation of said counter to the shift register mode including means for de-energizing said second gate and energizing said third gate while maintaining the priorly existing binary conditions at the inputs to said gate.

6. A binary counter and shift register for a telephone line concentrator system including a plurality of cascaded binary stages, interstage steering networks intermediate said stages, said networks including first, second and third gates, means for permanently coupling said first gates between a succeeding and following stage, means for energizing said second gates to couple said preceding and following stages during shift register operation, means for energizing said third gates to couple said preceding and following stages during binary counter operation, a count pulse source for propagating pulses through said stages during binary counter operation, a shift pulse source for propagating signals through said stages during shift register operation, a plurality of substations, scanner means for examining said substations for service requests under control of said stages during binary counter operation, and means for transforming operating modes while maintaining the existing binary conditions at said gates.

7. An interstage network for a convertible binary counter having a plurality of cascaded stages in which each stage includes a first and second binary cell, said network including first, second and third diode-capactior gating means, means for coupling said first gating means between said first cells of a preceding and succeeding stage, control means for applying an energizing potential intermediate said diode and capacitor of said second gating means to couple said second cell of a preceding stage to said second cell of a succeeding stage for shift register operation, and means for energizing said control means to apply an energizing potential intermediate said diode and capacitor of said third gating means to couple said first cell of said preceding stage to said second cell of said succeeding stage for binary counter operation.

8. An interstage network in accordance with claim 7 wherein said means for applying said energizing potentials intermediate said diodes and capacitors of said second and third gating means includes binary flip-flop means.

9. A combined shift register and binary counter circuit including a plurality of tandemly connected stages, said stages comprising binary elements, interstage coupling means between said stages, said coupling means including a plurality of diodes and capacitors serially coupling said stages, bias means connected at the junctions intermediate said diodes and capacitors, control means for converting from binary counter to shift register operation including means for altering bias potentials on said diodes and capacitors for converting between operating modes while maintaining predetermined potentials at the inputs to said coupling means, and means responsive to said control means and effective on the storage of a particular binary condition in a preceding stage of said circuit for diverting current through one of said capacitors from said binary element of a succeeding stage to control said succeeding stage to store said particular binary condition.

10. A binary register including a plurality of tandemly connected binary stages, each of said stages including first and second binary elements, biasing means coupled to said binary elements, delay means disposed intermediate said biasing means and a particular binary element of each of said stages, and means effective upon the de-energization of said biasing means for delaying the application of bias potential to said particular binary elements to favor the energization of said other binary elements in each of said stages.

11. A binary register in accordance with claim 10 wherein said delay means includes inductive means.

12. A convertible binary counter and shift register comprising a plurality of cascaded binary stages, each of said stages including first and second transistor flip-flops, interstage coupling means for transferring signals between said stages including first, second and third gating means intermediate said stages, control flip-flop means for governing the mode of operation of said binary stages and for transforming operating modes while maintaining the existing binary inputs to said gates, means effective in response to the operation of said control flip-flop to a first condition indicative of the binary counter mode of operation for coupling said first gating means to first transistors of said flip-flops of adjacent binary stages and for coupling said third gating means to said first transistors of a preceding stage and said second transistors of a succeeding stage, means effective in response to the operation of said control flip-flop means to a second condition indicative of the shift register mode of operation for coupling said first gating means to said first transistors of adjacent stages and for coupling said second gating means to said second transistors of adjacent stages, and means effective during mode transformations for maintaining the priorly existing binary conditions of the inputs to said gating means from said preceding stages.

13. A convertible binary counter and shift register in accordance with claim 12 including in addition resistance-capacitance means coupled between said control flip-flop means and said gating means to delay the application of potentials from said control flip-flop means to said gating means to a rise time substantially slower than the rise time of signals transferred between said stages.

References Cited by the Examiner

UNITED STATES PATENTS

| | | | |
|---|---|---|---|
| 2,404,466 | 7/1946 | Taylor et al. | 179—9 |
| 2,715,658 | 8/1955 | Dunlap et al. | 179—27 |
| 2,781,447 | 2/1957 | Lester | 328—45 |
| 2,819,840 | 1/1958 | Huntley et al. | 328—37 |
| 2,832,831 | 7/1958 | Belliveau | 179—7.1 |
| 2,900,500 | 8/1959 | Edwards | 328—37 |
| 3,056,044 | 9/1962 | Kroos | 328—42 X |
| 3,146,345 | 8/1964 | Conover | 328—37 X |

E. JAMES SAX, *Primary Examiner.*

JOHN F. MILLER, *Examiner.*

L. A. WRIGHT, *Assistant Examiner.*